INVENTOR.
EDWRD L. GOODWIN
BY
ATTORNEY

Nov. 30, 1965  E. L. GOODWIN  3,221,150
TIME ACCUMULATOR SYSTEM
Original Filed March 13, 1961  4 Sheets-Sheet 2

INVENTOR.
EDWARD L. GOODWIN
BY
ATTORNEY

Nov. 30, 1965  E. L. GOODWIN  3,221,150
TIME ACCUMULATOR SYSTEM
Original Filed March 13, 1961  4 Sheets-Sheet 3

INVENTOR.
EDWARD L. GOODWIN
BY
ATTORNEY

Nov. 30, 1965  E. L. GOODWIN  3,221,150
TIME ACCUMULATOR SYSTEM
Original Filed March 13, 1961  4 Sheets-Sheet 4
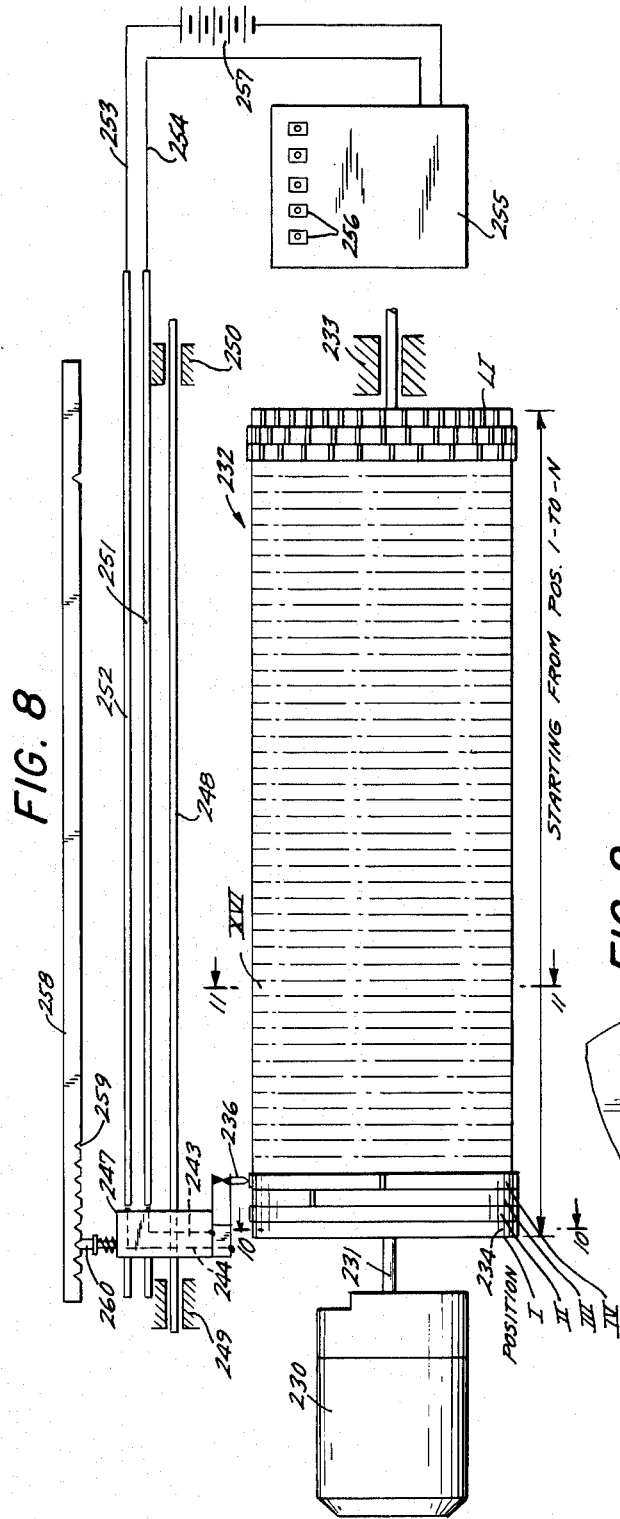
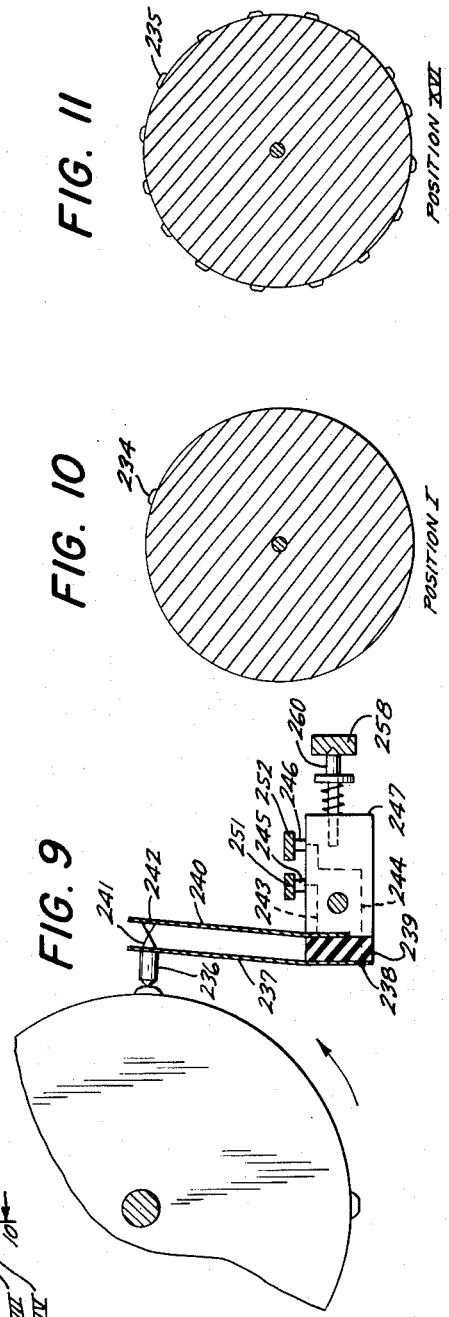
INVENTOR.
EDWARD L. GOODWIN
BY
ATTORNEY

United States Patent Office 3,221,150
Patented Nov. 30, 1965

3,221,150
TIME ACCUMULATOR SYSTEM
Edward Leavitt Goodwin, 26 Madison Ave.,
Garnerville, N.Y.
Continuation of application Ser. No. 95,070, Mar. 13,
1961. This application Apr. 11, 1963, Ser. No. 272,486
2 Claims. (Cl. 235—92)

This application is a continuation of application Serial No. 95,070 filed March 13, 1961, now abondoned.

The present invention relates to a time accumulator system and it particularly relates to a time accumulator system designed for recording the partial and total hours expended in connection with certain operations or jobs as the case may be.

It is among the objects of the present invention to provide a simple reliable system for accumulating or recording subtotal and total hours for a job or operation which will give such hours or time totals regardless of the number of persons who may be employed thereon and regardless of the interruptions that may take place in the employment of any one person on the particular job in question.

Another object is to provide a simplified system for accumulation of time or recording time on jobs which will simplify accounting procedures and which will not require excessive accounting labor and in which the expense of operation of each job may be accurately determined without handling a large number of individually punched cards.

A still further object is to provide improved industrial cost accounting and cost control systems which will permit a rapid and speedy determination of costs of labor or time per job without the need of providing, auditing or handling the large number of individually punched cards per person per job.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects, it has been found most satisfactory according to one embodiment of the present invention to provide a single recorder or time clock arrangement which will be actuated by a card or other manual arrangement incidental to each man coming upon a job.

The indication may if desired be credited to a particular person and the time rate also calculated in accordance with the time rate of the particular person whose card is punched.

When any person leaves the job a similar operation takes place either by way of insertion of a card or by other manual control so that the time being accumulated for the particular person is discontinued while the time accumulation continues for any and all other persons on the job.

The accumulator may be of the electrical type or mechanical type, and there may be provided rotating members, the speed, rate or count of which will be varied in accordance with the number of persons working on the job.

In one form of the invention, a sixty cycle motor driven time clock may be employed provided with separate slots to receive in-cards and out-cards.

Not only will the total time be calculated for any other job or operation, but in addition, the time may be accumulated for each individual on the job whether it be for a day, week, month or longer periods.

Such an operation should take place without the punching and handling of a large number of individual cards, and the clock device may be provided with printing wheels and/or tapes and printing tickets to permit a permanent record of the time accumulations per person or per job or both and also to permit subtotals at any time during the continuation of the job.

With the foregoing and other objects in view, the invention consists of the novel construction, combination and arrangement of parts as hereinafter more specifically described and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

FIG. 8 is a side elevational view of an alternative mechanical arrangement showing varying ridged wheels or gears which may be utilized in accumulated time per job or per operation.

FIG. 9 is a frequency side elevational view of the upper left hand corner contact arrangement shown in FIG. 8.

FIG. 10 is a side transverse sectional view taken upon the line 10—10 of FIG. 8 showing the initial wheel.

FIG. 11 is a transverse side sectional view taken upon the line 11—11 of FIG. 8 showing a higher rating wheel.

Figure 1:
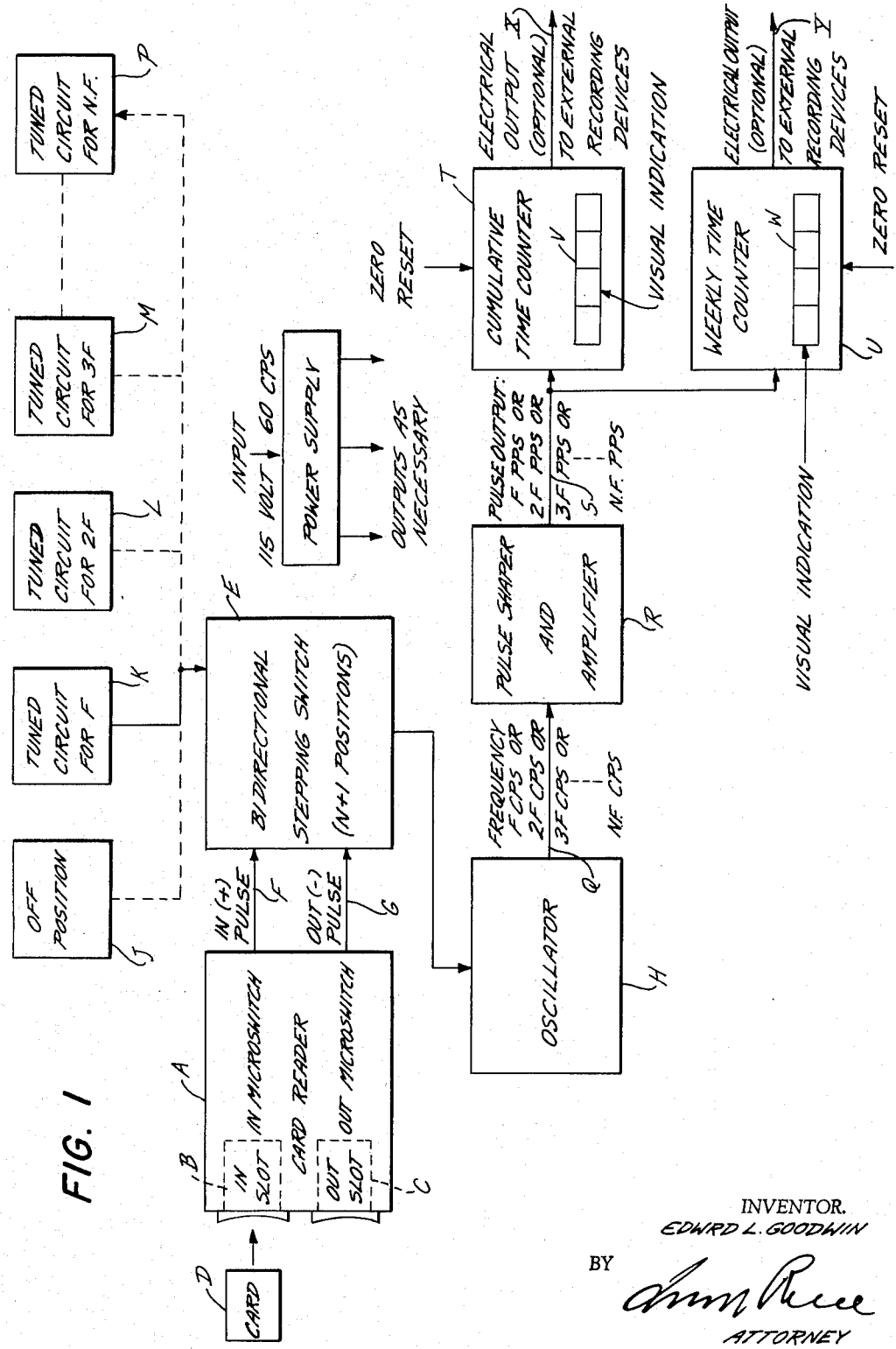
FIG. 1 is a diagrammatic layout of an electronic system for accumulated time per job or operation.

Referring to FIG. 1, there is shown a simple configuration for automatically accumulating time at a rate which is exactly proportional to the number of people working on the job, operation or project at any specific time.

There is shown a main time clock A which will have an in-slot B and an out-slot C each provided with a microswitch actuated by an employee's card D.

The in-slot will give an electrical signal or pulse to a bidirectional stepping switch E.

This switch will receive an in-pulse by the circuit F or an out-pulse by the circuit G.

For example, the first person checking in will result in the switch E stepping from its off position on its first position whereas the second person would cause the switch to step to the second position and so on for each person checking in by inserting the card D in the in-slot B.

Each person on the other hand checking out by inserting his card in the out-slot C will step down the switch to a lower position so that when all people check out, the switch will be stepped back to off position.

The position of the switch E will at all times indicate the number of people working on the job regardless of the order or number of people that may check in or check out.

Each position of the stepping switch E connects a frequency determining tuned circuit to an electronic oscillator H.

For example, there will be a blank off position J, and there will be a different frequency circuit K for the first step, L for the second step and M for the third step up to P for the last step.

Thus the frequency generated by the oscillator H will always be directly proportional to the number of people working at the time in question.

As a result of the operation of the stepping switch E and the oscillator H, the electrical signal will be supplied through the conduit Q at a frequency depending upon the tuned circuit K, L, M, N or P and then the electrical pulse or signal will be shaped and/or amplified at R and supplied through the conduit S to the accumulated time counter T on the one hand or to the weekly time counter U on the other hand each of which is provided with a visual signal V and W respectively.

There may be electrical outputs X and Y from each of these counters to external recording devices.

In the arrangement as shown in FIG. 1, the rate of the pulses will be identical with the frequency of the signal generated by the oscillator H.

Each of these counters T and U may be reset to zero at any time interval when the project or job has been accumulated, and there will be a current indication of time accumulation at all times either totally or for the week.

In the arrangement shown in FIG. 1, the initial input device A may be independent or it may be correlated with the standard punch-in/punch-out time clock or a separate card reader as shown may be employed, or a button arrangement may be provided, one button being provided for each employee.

These buttons may also be provided with a key arrangement so that the employee will only punch the proper button or key arrangement.

A single slot may also be used for slots B and C with an edge notched card controlling the in and out operation and with a microswitch acting on each side or even on opposite edges of the card.

The switches E are desirably available for ten, twenty-five or fifty positions but an equivalent multiple relay arrangement can be utilized.

Instead of a single oscillator H with switch tuned circuits K, L, M, N and P, it is also possible to use fixed frequency oscillators, the selection of which may be controlled by the stepping switch.

The pulse operated counters T and U are of the impulse-actuated digital type or equivalent.

In lieu of digital type controls, elapsed time meters operated from sine wave sources may be utilized, and the elapsed time counter may be directly proportional to the frequency generated. In this case, no pulse forming or shaping circuitry is necessary.

The last mentioned arrangement requires an elapsed time meter movement capable of operating over a frequency range of at least twenty to one.

In addition to providing the visual display at V and W, simultaneously signals may be provided at X and Y to tape punches or card punches, to provide for various types of permanent or impermanent records.

Figure 2:
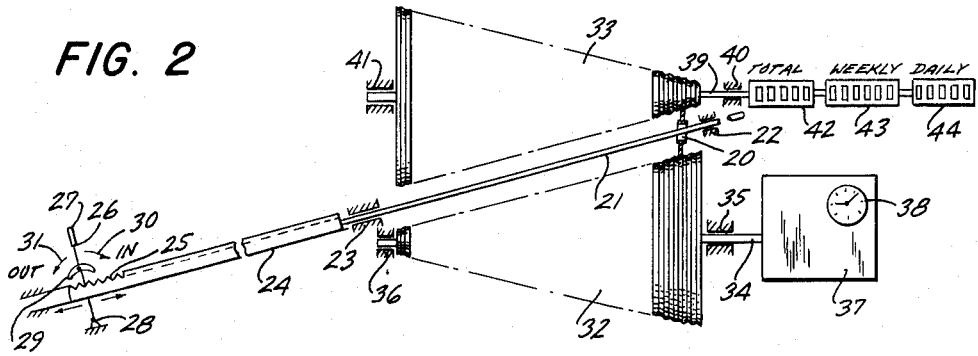
FIG. 2 is a side elevational view showing diagrammatically an electro-mechanical device that may be utilized for a similar operation.

In FIG. 2 there is shown a mechanical arrangement by means of which a roller or rider 20 is moved up and down on the shaft 21 which in turn has the end bearings 22 and 23.

The position of the rider wheel 20 is regulated by means of the ratchet bar member 24 which has the teeth 25 and may be stepped up or down by the lever.

The lever 26 has a handle 27 and a pivot mount 28 together with the double pawl 29.

The pawl 29 may be moved in the direction 30 when additional workers report in at the rate of one notch per person or it may be moved in a down or out direction 31 as the workers check out.

The rider wheel 20 will transmit motion from the lower stepped cone 32 to the upper stepped cone 33.

The lower stepped conical roller 32 has the shaft 34 with the bearings 35 and 36.

It is driven by the synchronous motor 37 provided with a clock 38.

The upper stepped conical roller 33 is mounted on the shaft 39 with the bearings 40 and 41, and it drives the total counter 42, the weekly counter 43 and the daily counter 44.

These counters will give the number or hours per job for the entire time or on a weekly or daily basis regardless of the number of persons checking in or checking out.

Figure 3:
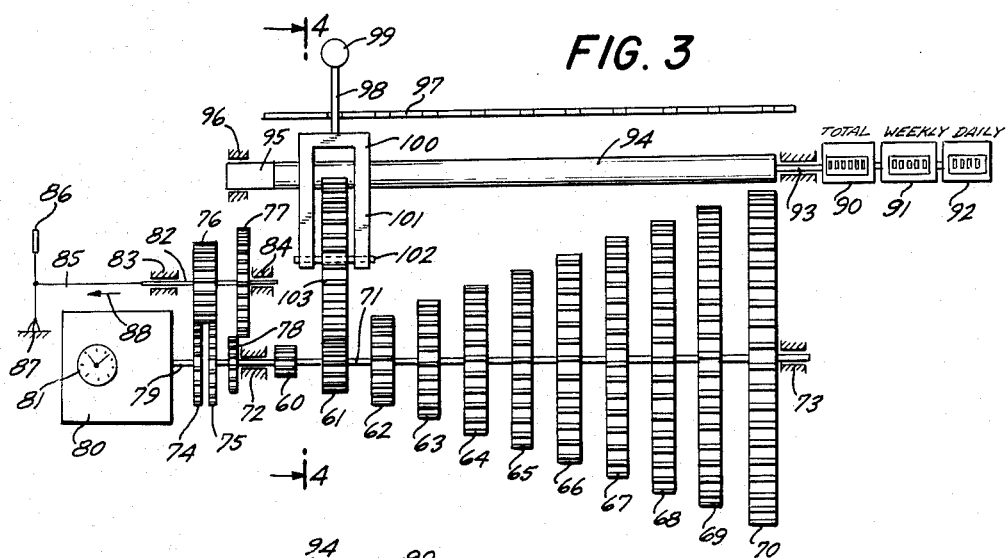
FIG. 3 is a side elevational view of an alternative arrangement showing a gearing arrangement of different sized gears.
Figure 4:
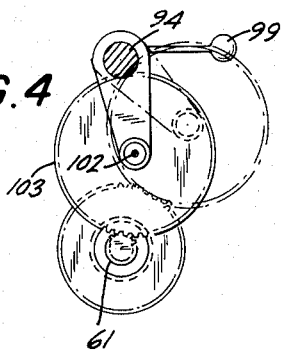
FIG. 4 is a side sectional view showing the meshed gearing in position at the lowest accumulating rate upon the line 4—4 of FIG. 3.
Figure 5:
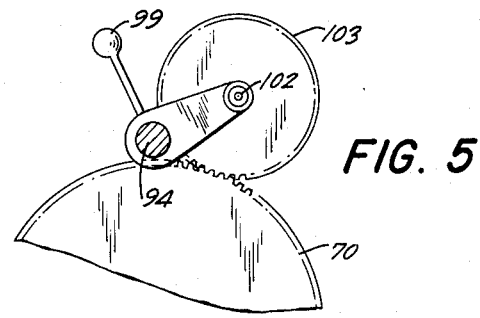
FIG. 5 is a diagrammatic side elevational view showing the gearing in position with the highest accumulating rate adjusted automatically to match the number of individuals on the job at any given time.

In the arrangement shown in FIGS. 3, 4 and 5, there is provided a series of gears 60, 61, 62, 63, 64, 65, 66, 67, 68, 69 and 70, each of which corresponds to a person working on the job.

These gears are mounted on a shaft 71 having bearings 72 and 73 and driven from a gearing arrangement 74, 75, 76, 77 and 78.

As shown, the shaft 79 is driven by the synchronous motor 80 having the clock 81.

The shaft 79 drives the gear 74 which may mesh with the large gear 76 on the shaft 82 having the bearings 83 and 84.

The shaft 82 may be shifted by means of the arm 85 and the lever 86 having the pivot mount 87.

In the position as shown, the shaft 82 permits the gear 76 to transmit motion from the shaft 79 to the shaft 71 through the gears 74, 75 and 76 and with the shafts 71 and 79 turning at the same rate.

On the other hand, the gear 76 may be disengaged from the gear 75 by movement to the left as indicated by the arrow 88.

In this case, the gears 77 and 78 will be meshed together transmitting motion through the gears 74, 76, the shaft 82 and the gears 77 and 78.

This will result in the shaft 71 turning more quickly than the shaft 79.

The total counter 90, the weekly counter 91 and the daily counter 92 are driven from the shaft 93, which carries the long splined shaft member 84 which has a smooth end portion 95 with a bearing 96.

There is provided a notched position bar 97 which may register with the arm 98 of the ball end 99 of the clevis member 100.

This clevis member 100 has the side legs 101 which carry the shaft 102 on which rotates the large gear 103.

The gear 103 may be manipulated to mesh with the small gear 61 as shown in FIGS. 3 and 4 or with the large gears 70 as shown in FIG. 5 by having its position changed from the left to the right end of the apparatus as shown in FIG. 3.

The position of FIG. 5 will give the highest rate whereas the position of FIG. 4 will give the next to the lowest rate.

Both in FIG. 2 the number of steps in the cones 32 and 33 and in FIG. 3, the number of different sized gears 60 to 70 may be widely changed depending upon the number of persons who may be working on any particular job.

Figure 6:
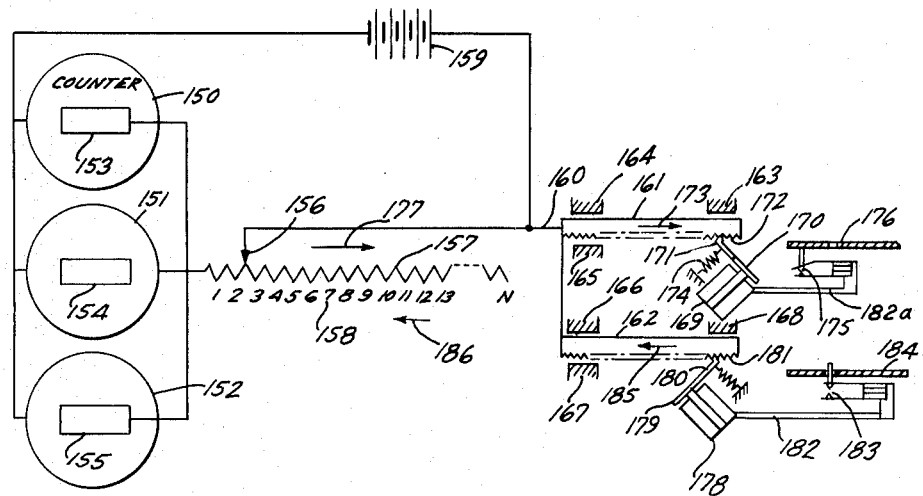
FIG. 6 is a diagrammatic top plan view of an electrical counter arrangement employing relays for calculating the amount of time accumulation per job or per operation.

In FIG. 6, there is shown an electrical arrangement with a total count of 150, a weekly count of 151 and a daily count of 152 and having a window 153, 154 and 155 respectively.

The movable contactor 156 may be moved along the resistance 157 which has a series of positions as indicated at 158, one for each employee.

The system is provided with a storage battery or other electrical energy source 159 and the contactor is moved by means of the rod 160 and the ratchet bars 161 and 162.

The upper ratchet bar 161 has the bearing elements 163, 164 and 165 and the lower bar 162 has the bearing elements 166, 167 and 168.

The relay coil 169 will have a pawl armature 170, the tooth 171 of which acts on the ratchet teeth 172 to advance the tooth 171 in the direction 173.

The spring 174 will tend to press the tooth 171 into engagement with the teeth 172.

The relay arm 179 is connected by the circuit 182 to the switch element 175 which may be operated by the punch card 176 in the end position so as to move the contactor 176 to a greater number of workmen in the direction 177.

The lower relay coil 178 has the armature 179 with the ratchet 180 engaging the teeth 181 on the lower edge of the bar 162.

The arm 178 will be connected to the circuit 182 which in turn is connected to the switch 183 operated by the punch card 184.

This will give an out operation causing the bar 162 to be moved in the direction 185 and to move the contactor in the direction 186.

By the electrical arrangement shown in FIG. 6, therefore, the indication or accumulation is achieved by varying the resistance which in turn varies the current determined by the change in position of the contact 156 on the elongated resistance element 157.

Figure 7:
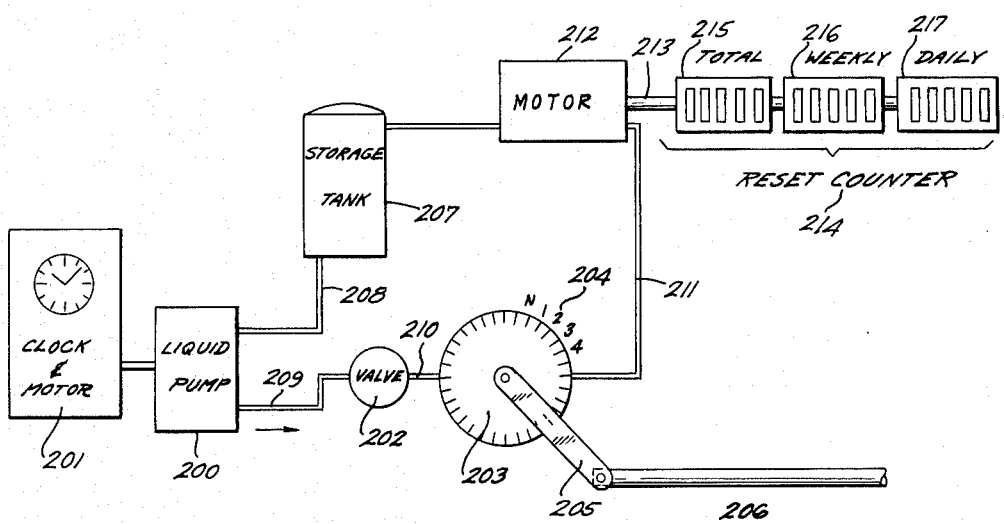
FIG. 7 is a diagrammatic layout showing a hydraulic system which may be utilized for giving totals per job or per operation.

In the arrangement shown in FIG. 7, there is a hydraulic or pneumatic pump 200 driven by the clock motor 201.

This pump will deliver fluid past the pressure regulator valve 202 and the variable valve 203.

The variable rate valve 203 has a number of different positions 204 with the arm 205 being shifted by the rod 206 to a position corresponding to the number of workmen.

The pump will draw the fluid from the storage 207 through the conduit 208 with the fluid passing through the lines 209, 210 and 211 to the motor 212 past the valves 202 and 203.

The motor 212 will drive the shaft 213 which will in turn drive the reset counter 214 having a total counter 215, a weekly counter 216 and a daily counter 217.

In the embodiment shown in FIGS. 8 to 11, there is shown a motor 230 which through a shaft 231 drives a series of wheels or disks 232.

Each of these disks is keyed to the shaft 231 which has a bearing 233.

Each disk or wheel will have a series of short ridges extending transversely across the periphery thereof as indicated at 234 for the initial wheel and at 235 on the periphery of the wheel in position sixteen.

The disks from left to right will each be different from the preceding disk by having one additional ridge thereon.

These ridges in being turned by the shaft 231 will actuate switch actuator member 236 which operates on the leaf spring 237 riveted or otherwise attached to the insulation block 239. Then the leaf spring contact carrier 240 will be parallel to the leaf spring contact 237.

These leaf springs will have contact points 241 and 242 which when in contact will establish circuits through wires to the external sliding contacts.

The external projecting contacts 245 and 246 slide against and establish a circuit with the rectangular cross section bars 251 and 252 (see FIGS. 8 and 9).

A circuit will thus be established when the contacts 241 and 242 are closed through the leads or wires 243 and 244, the sliding contactors 245 and 246 and the bars 251 and 252.

The external connections 245 and 246 are connected by the bars 251 and 252 and the wires 253 and 254 to the counter 255 having the windows 256.

The storage battery or other power source 257 will supply the necessary energy.

The switch actuating member 236 operated by the ridges 234 and 235 may be fixed in any desired adjusted position by means of the notched bar 258 having the position notches 259, one for each disk 232.

The spring pressed plunger member 260 will latch the block 247 so that the switch actuating member 236 will be actuated by any selected disk from the first position to the fifty-first position.

It is thus apparent that the applicant has provided a simple arrangement for regulating an accumulated arrangement by either mechanical or electrical devices which can accumulate time regardless of the number of persons working on the job and regardless of a constant shift of personnel onto the operation or away from the operation.

As many changes could be made in the above time accumulator system, and many widely different embodiments of this invention could be made without departing from the scope of the claims, it is intended that all matter contained in the above description shall be interpreted as illustrative and not in a limiting sense.

Having now particularly described and ascertained the nature of the invention, and in what manner the same is to be performed:

What is claimed is:

1. A time accumulator system to accumulate hours expended in connection with jobs for industrial cost accounting and cost control where a large number of persons are used per job for varying time periods comprising a plurality of flat smooth circular disks having spaced transversely extending short ridges on the periphery varying from one to the largest number of persons employed, said disks having central aligned openings and all being of the same external diameter, a sixty cycle time clock motor, a shaft extending through said aligned openings driven by said motor, said disks being all keyed to said shaft, a plurality of parallel elongated metallic elements parallel to and extending above said shaft, a rectangular insulating plastic block mounted on a first one of said elongated elements, two separated leaf elongated spring elongated rectangular elements at one side of said block having inwardly projecting end contacts at the outside ends normally separated from each other, a presser member mounted on the outside end of one of said spring contact members, on the opposite side of said spring contacts and positioned in the path of said ridges on said disks, said spring leaf elements being positioned parallelly to said shaft, projecting separate electrical contact slider elements on an adjacent side of said block to contact a second and third of said metallic elements, said block being slidable along said first, second and third metallic elements, separate conductor wires embodied in said block extending from the spring elements to the slider elements, said spring elements having roots mounted in said block connected to said wires, a spring pressed elongated locator pin member on another side of said block, a fourth elongated element having a plurality of notches, opposite and correspondingly positioned for each disk to locate said block at a selected disk, said pin member being on the side of the block opposite the disks and extending transversely to said shaft and said end contacts and presser member extending transversely to said shaft between said block and said disks, two electrical connections from the ends of the second and third elements, a battery on one of said connections and a counter on the other connections and an electrical connection from the battery to the counter, said first, second and third elements being rectangular in cross section and said first element being circular in cross section.

2. The system of claim 1, said first, second and third elements being rectangular in cross section and said first element being circular in cross section and said elements being positioned one above the other in the order of first, second, third and fourth and said presser member and pin member being at opposite sides of said block.

(References on following page)

References Cited by the Examiner

UNITED STATES PATENTS

| | | | |
|---|---|---|---|
| 356,418 | 1/1887 | Nickum | 178—84 |
| 1,084,661 | 1/1914 | Poole | 235—92 |
| 1,259,282 | 3/1918 | Prouty | 235—92 |
| 1,773,421 | 8/1930 | Bryce | 235—301 |
| 2,019,902 | 11/1935 | Geer et al. | 235—92 |

FOREIGN PATENTS

| | | |
|---|---|---|
| 18,252 | 12/1904 | Great Britain. |
| 115,335 | 12/1929 | Austria. |

MALCOLM A. MORRISON, *Primary Examiner.*

DARYL W. COOK, *Examiner.*